Feb. 23, 1932.  C. J. MAXCY  1,846,605
INCLOSURE CONSTRUCTION
Filed Sept. 25, 1930
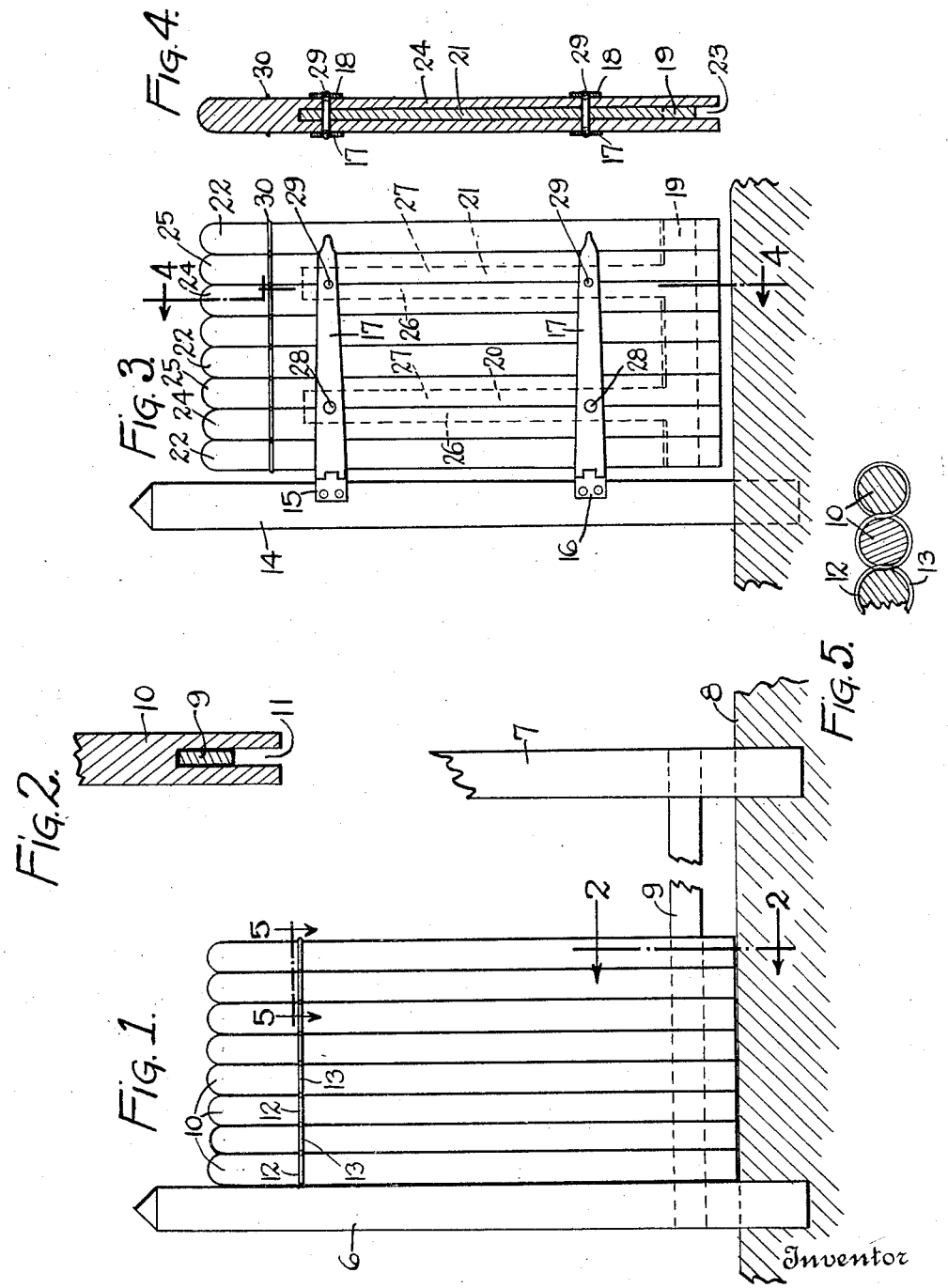
Inventor
CHARLES J. MAXCY
By His Attorney Patented Feb. 23, 1932

1,846,605

UNITED STATES PATENT OFFICE

CHARLES J. MAXCY, OF RUTHERFORD, NEW JERSEY, ASSIGNOR OF ONE-HALF TO MATTHEW B. SENTNER, OF NEW YORK, N. Y.

INCLOSURE CONSTRUCTION

Application filed September 25, 1930. Serial No. 484,298.

My invention relates to improved inclosure constructions, for example, fences and gates composed of upright palings and posts, and has for its objects, among other things, the provision for a simplified, yet rigid and compact structure in which the several parts may be readily assembled and rigidly held in operative position.

According to my invention, the upright palings are supported upon a bar running more or less horizontally between spaced-apart posts set in the earth by having the lower portions of the palings slotted to fit over and conceal such horizontal bar which supports same. The palings are preferably arranged in contacting and mutually parallel position on the bar, and their upper portions may be held in vertical alinement on the bar by any suitable devices.

With these and other objects in view, my invention resides in the novel features of construction, combination and arrangement of parts to be hereinafter more fully described and claimed, and is shown in the accompanying drawings in which—

Fig. 1 is a side elevation of the fence structure partly broken away;

Fig. 2 is an enlarged detailed section on the line 2—2 of Fig. 1;

Fig. 3 is a side elevation of the gate structure;

Fig. 4 is a sectional view on the line 4—4 of Fig. 3; and

Fig. 5 is an enlarged cross-section on the line 5—5 of Fig. 1.

Similar numerals refer to similar parts throughout the several figures.

Referring more particularly to Figs. 1, 2 and 5, the fence structure comprises the upright posts 6 and 7 set up in the ground 8 in spaced-apart position as shown in Fig. 1. The posts 6 and 7 are connected by the bar 9 preferably set slightly above the ground 8 (Fig. 1), and such bar 9 is preferably rectangular in cross-section and is secured to the posts 6 and 7 on edge as shown in Fig. 2.

The individual palings 10 are shown in the drawings as circular in horizontal section (Fig. 5), and have the vertical open-ended slots 11 formed in their butt ends (Fig. 2). Palings of other forms may be used if desired. Such palings 10 are placed side by side in upright position on the bar 9 with the slotted lower ends fitted to the bar as shown in Fig. 2. The series of palings 10 are then arranged on the bar 9 to be in mutually parallel and contacting position between the posts 6 and 7 as shown in Fig. 1.

The upper portions of palings 10 are held in vertical alinement between the posts 6 and 7 by any suitable means such as wires or dowels. In the embodiment shown in Figs. 1 and 5, the intermeshing wires 12 and 13 are interwoven and counter-sunk around the successive palings 10, and the ends of the wires are pulled taut and secured to the posts 6 and 7.

In the gate structure shown more particularly in Figs. 3 and 4 the post 14 carries the metal vertically spaced apart hinge brackets 15 and 16 to which are pivoted the outer and inner hinge members or straps 17 and 18 substantially equal in length to the depths of the gate (Fig. 3). The metal gate frame for holding the row of palings comprises the horizontal bar 19 substantially similar to the bar 9 in the fence structure of Figs. 1 and 2 to which bar 19 are welded the upright spaced-apart bars 20 and 21. The individual palings 22 are vertically slotted at 23 at their butt ends like the palings 10 and the palings 24 and 25 are also slotted at 23 and are longitudinally slotted at 26 and 27 respectively along their oppositely disposed sides to contain the upright bars 20 and 21. Such adjacent palings 24 and 25 upon assembling the gate structure will thereby cover the metal gate frame so that no part thereof is visible.

In assembling this gate structure, the center set of palings 22, 24 and 25 between the center lines of the upright bars 20 and 21 is first built up and fitted on the bar 19, and then the two pairs of outside palings 22, 24 and 25 (Fig. 3) are inserted and fitted to the gate frame on the bar 19 as shown. Then the hinge straps 17 and 18 for both hinges are secured outside the palings (Fig. 4) by the pair of rivets 28 and 29. Other means for rigidly securing the hinge straps 17 and 18 to the metal gate frame and palings may be used if desired. The upper ends of the palings 22, 24 and 25 are also held in alinement by the wire 30 extending horizontally the depth of the gate as shown in Figs. 3 and 4.

It will be observed that my improved inclosure construction comprising the fence and gate structure herein shown and described has the same general appearance on both sides, and that in the gate structure of Figs. 3 and 4 the palings as assembled and rigidly secured effectively cover and conceal the supporting frame composed of the bar 19 and uprights 20 and 21. Furthermore that the individual palings slotted in their lower or butt ends are adapted for ready assembling to be thereafter supported and held in rigid alinement between the posts 6 and 7, the whole to form a compact and sturdy fence and gate structure.

It is understood that numerous details of construction may be varied through a wide range without departing from the principles of my invention or sacrificing its chief advantages.

I claim as my invention:

1. A gate structure comprising a horizontally-disposed supporting bar having spaced-apart upright bars secured thereto, separate pairs of upright palings slotted in their lower portions and sides to fit over and conceal said horizontal and upright bars, and upright palings having their lower portions slotted to fit over said horizontal bar, all of the palings being arranged in contacting and mutually parallel position.

2. A gate structure comprising a horizontally-disposed supporting bar having spaced-apart upright bars secured thereto, separate pairs of upright palings slotted in their lower portions and sides to fit over and conceal said horizontal and upright bars, upright palings having their lower portions slotted to fit over said horizontal bar, all of the palings being arranged in contacting and mutually parallel position, and upper and lower hinge straps extending transversely and outside the palings and secured to said upright bars.

3. A gate structure comprising a horizontally-disposed supporting bar having spaced-apart upright bars secured thereto, separate pairs of upright palings slotted in their lower portions and sides to fit over and conceal said horizontal and upright bars, upright palings having their lower portions slotted to fit over said horizontal bar, all of the palings being arranged in contacting and mutually parallel position, upper and lower hinge straps extending transversely and outside the palings and secured to said upright bars, and means for holding the upper portions of said palings in vertical alinement.

4. An inclosure construction comprising a horizontally-disposed supporting bar, a plurality of upright palings axially and openly slotted in their butt ends and removably fitting over said bar whereby the palings are supported in alinement on said bar, and means for holding the upper portions of the palings in vertical alinement.

5. An inclosure construction comprising a horizontally-disposed supporting bar, a plurality of upright and mutually contacting palings axially and openly slotted in their butt ends and removably fitting over said bar whereby the palings are supported in alinement on said bar, and means for holding the upper portions of the palings in vertical alinement.

6. A fence structure comprising spaced-apart posts, a horizontally-disposed bar secured to said posts, and a plurality of upright palings arranged between the posts, said palings having their butt ends axially and openly slotted to removably fit over said bar whereby said palings are supported in alinement on said bar.

7. A fence structure comprising spaced-apart posts, a horizontally-disposed bar secured to said posts, a plurality of upright palings arranged between the posts, said palings having their butt ends axially and openly slotted to removably fit over said bar whereby said palings are supported in alinement on said bar, and means for holding the upper portions of the palings in vertical alinement.

8. A fence structure comprising spaced-apart posts, a horizontally-disposed bar secured to said posts, a plurality of upright palings arranged between the posts, said palings having their butt ends axially and openly slotted to removably fit over said bar whereby said palings are supported in alinement on said bar, and means secured between the posts and to the palings for holding the upper portions of the palings in vertical alinement.

CHARLES J. MAXCY.